US012755070B2

(12) United States Patent
Togawa et al.

(10) Patent No.: US 12,755,070 B2
(45) Date of Patent: Oct. 6, 2026

(54) METHOD, DEVICE, AND MEDIUM FOR BIT-WIDTH REDUCTION IN ISING MODEL

(71) Applicant: WASEDA UNIVERSITY, Tokyo (JP)

(72) Inventors: Nozomu Togawa, Tokyo (JP); Masashi Tawada, Tokyo (JP); Daisuke Oku, Tokyo (JP); Shu Tanaka, Tokyo (JP)

(73) Assignee: WASEDA UNIVERSITY, Tokyo (JP)

( * ) Notice: Subject to any disclaimer, the term of this patent is extended or adjusted under 35 U.S.C. 154(b) by 790 days.

(21) Appl. No.: 18/256,552

(22) PCT Filed: Nov. 16, 2021

(86) PCT No.: PCT/JP2021/042002

§ 371 (c)(1),
(2) Date: Jun. 8, 2023

(87) PCT Pub. No.: WO2022/130874

PCT Pub. Date: Jun. 23, 2022

(65) Prior Publication Data

US 2024/0104268 A1 Mar. 28, 2024

(30) Foreign Application Priority Data

Dec. 15, 2020 (JP) ................................ 2020-207989

(51) Int. Cl.
*G06F 30/23* (2020.01)
*G06F 119/06* (2020.01)

(52) U.S. Cl.
CPC .......... *G06F 30/23* (2020.01); *G06F 2119/06* (2020.01)

(58) Field of Classification Search
CPC .......... G06F 30/00; G06F 30/20; G06F 30/23; G06F 30/32; G06F 2119/06; G06N 5/01; G06N 7/01; G06N 99/00
USPC .......................................................... 703/2
See application file for complete search history.

(56) References Cited

U.S. PATENT DOCUMENTS

2019/0026645 A1 1/2019 Correll et al.

FOREIGN PATENT DOCUMENTS

WO WO-2016006071 A1 * 1/2016 .............. G06N 7/01

OTHER PUBLICATIONS

Oku, Daisuke et al., "How to Reduce the Bit-Width of an Ising Model by Adding Auxiliary Spins", Dec. 15, 2020, IEEE Transactions on Computers, vol. 71, No. 1, IEEE. (Year: 2020).*
Matsubara, Satoshi et al., "Ising Model Optimizer with Parallel Trial Bit Sieve Engine", 2018, Advances in Intelligent Systems and Computing 611, Springer International Publishing AG. (Year: 2018).*
(Continued)

*Primary Examiner* — Cedric Johnson
(74) *Attorney, Agent, or Firm* — RIMON P.C.

(57) ABSTRACT

A calculation method reduces a bit-width of an Ising model, the Ising model being expressed in terms of a plurality of spins, interaction coefficients between the plurality of spins, and external magnetic field coefficients acting respectively on the plurality of spins. The calculation method includes: adding an auxiliary spin to the Ising model; and setting a new interaction coefficient between the auxiliary spin and at least one of the plurality of spins to obtain a new Ising model, thereby reducing a bit-width of at least one of the interaction coefficients between the plurality of spins and the external magnetic field coefficients acting respectively on the plurality of spins.

6 Claims, 7 Drawing Sheets

(56) References Cited

OTHER PUBLICATIONS

Takehara, Kota et al., “A Multiple Coefficients Trial Method to Solve Combinatorial Optimization Problems for Simulated-Annealing-Based Ising Machines”, 2019, IEEE 9th International Conference on Consumer Electronics (ICCE-Berlin), IEEE. (Year: 2019).*

Yoshimura, Chihiro et al., “FPGA-Based Annealing Processor for Ising Model”, 2016, Fourth International Symposium on Computing and Networking, IEEE. (Year: 2016).*

Shikuri, Yuta. (2020). Efficient Conversion of Bayesian Network Learning into Quadratic Unconstrained Binary Optimization. (13 pages).

K. Takehara, D. Oku, Y. Matsuda, S. Tanaka and N. Togawa, “A Multiple Coefficients Trial Method to Solve Combinatorial Optimization Problems for Simulated-annealing-based Ising Machines,” 2019 IEEE 9th International Conference on Consumer Electronics (ICCE-Berlin), Berlin, Germany, 2019, pp. 64-69, doi: 10.1109/ICCE-Berlin47944.2019.8966167. (6 pages).

D. Oku, M. Tawada, S. Tanaka and N. Togawa, “How to Reduce the Bit-Width of an Ising Model by Adding Auxiliary Spins,” in IEEE Transactions on Computers, vol. 71, No. 1, pp. 223-234, Jan. 1, 2022, doi: 10.1109/TC.2020.3045112.

International Search Report issued in International Application No. PCT/JP2021/042002 dated Jan. 18, 2022, with English translation.

* cited by examiner

METHOD, DEVICE, AND MEDIUM FOR BIT-WIDTH REDUCTION IN ISING MODEL

CROSS REFERENCE TO RELATED APPLICATIONS

This application is the U.S. National Phase under 35 U.S.C. § 371 of International Application No. PCT/JP2021/042002, filed on Nov. 16, 2021, which claims the benefit of Japanese Application No. 2020-207989, filed on Dec. 15, 2020, the entire contents of each are hereby incorporated by reference.

TECHNICAL FIELD

The present invention relates to a calculation method, a calculation device, and a computer-readable storage medium.

BACKGROUND ART

A technique has been known that transforms combinatorial optimization problems for searching a best combination from various combinations into an Ising model and solves the problems using annealing machines or Ising machines (See for example, Non Patent Literature 1).

CITATION LIST

Non Patent Literature

Non Patent Literature 1: K. Takehara, D. Oku, Y. Matsuda, S. Tanaka, and N. Togawa, "A multiple coefficients trial method to solve combinatorial optimization problems for simulated-annealing-based ising machines," in Proc. IEEE 9th International Conference on Consumer Electronics (ICCE-Berlin). ieeexplore.ieee.org, September 2019, pp. 64-69.

SUMMARY OF INVENTION

Technical Problem

The bit-widths of interaction and external magnetic field coefficients in the Ising model, which are input into annealing machines or Ising machines, are limited in many hardware devices, and thus these hardware devices cannot handle any bit-width value. Using a shift method for truncating the lower bits to reduce the bit-widths leads to a change in a ground state which is the lowest-energy state of the Ising model. This makes it impossible to obtain a desired solution.

The invention has been made in view of the foregoing, and an object of the invention is to provide a calculation method, a calculation device, and a computer-readable storage medium which reduce a bit-width of an Ising model without changing a ground state.

Solution to Problem

A calculation method according to the invention is a calculation method for reducing a bit-width of an Ising model, the Ising model being expressed in terms of a plurality of spins, interaction coefficients between the plurality of spins, and external magnetic field coefficients acting respectively on the plurality of spins. The calculation method includes: adding an auxiliary spin to the Ising model; and setting a new interaction coefficient between the auxiliary spin and at least one of the plurality of spins to obtain a new Ising model, thereby reducing a bit-width of at least one of the interaction coefficients between the plurality of spins and the external magnetic field coefficients acting respectively on the plurality of spins.

A calculation device according to the invention is a calculation device configured to reduce a bit-width of an Ising model, the Ising model being expressed in terms of a plurality of spins, interaction coefficients between the plurality of spins, and external magnetic field coefficients acting respectively on the plurality of spins. The calculation device includes a processor configured to: add an auxiliary spin to the Ising model; and set a new interaction coefficient between the auxiliary spin and at least one of the plurality of spins to obtain anew Ising model, thereby reducing a bit-width of at least one of the interaction coefficients between the plurality of spins and the external magnetic field coefficients acting respectively on the plurality of spins.

A computer-readable storage medium according to the invention is a non-transitory computer-readable storage medium storing a program for executing a calculation method which reduces a bit-width of an Ising model, the Ising model being expressed in terms of a plurality of spins, interaction coefficients between the plurality of spins, and external magnetic field coefficients acting respectively on the plurality of spins. The program causes a computer to execute: adding an auxiliary spin to the Ising model; and setting a new interaction coefficient between the auxiliary spin and at least one of the plurality of spins to obtain a new Ising model, thereby reducing a bit-width of at least one of the interaction coefficients between the plurality of spins and the external magnetic field coefficients acting respectively on the plurality of spins.

Advantageous Effects of Invention

According to the invention, by adding an auxiliary spin to an Ising model and setting a new interaction coefficient between the auxiliary spin and a spin of the Ising model to obtain a new Ising model, it is possible to reduce a bit-width of the Ising model without changing a ground state.

DESCRIPTION OF EMBODIMENTS

Exemplary embodiments of the invention will be described below with reference to the drawings. In the embodiments, an assumption is made that an integer has a sign bit and hence changing the sign of an integer does not change its bit-width. Therefore, an n-bit integer shows any integer within the range of $[-(2^{n-1}-1), 2^{n-1}-1]$.

<Ising Model>

An Ising model is a statistical mechanics model defined on an undirected graph G=(V, E), where V is a set of vertices and E is a set of edges. The Ising model is expressed in terms of a plurality of spins, interaction coefficients between the plurality of spins, and external magnetic field coefficients acting respectively on the plurality of spins. A spin $\sigma_i$ is defined on a vertex $i \in V$ and takes the value of +1 or −1 (up or down). An interaction coefficient $J_{i,j}$ is defined on an edge $(i, j) \in E$ which indicates a weight of connection between $\sigma_i$ and $\sigma_j$. An external magnetic field coefficient $h_i$ is defined on a vertex $i \in V$ which indicates a force on the spin $\sigma_i$.

The energy function (or Hamiltonian) H of the Ising model is given by Equation (1).

$$H = -\sum_{(i,j)\in E} J_{i,j}\sigma_i\sigma_j - \sum_{i\in V} h_i\sigma_i \quad (1)$$

In Equation (1), a constant value which does not depend on spins is omitted. In the embodiments, $J_{i,j}$ and $h_i$ are assumed to be integers.

An Ising model is stable at the lowest-energy state (ground state). Mapping optimal solutions of combinatorial optimization problems to the ground states of the Ising models may lead to obtaining the optimal solutions.

However, as described above, the bit-widths of the interaction and external magnetic field coefficients of the Ising models, which are input into annealing machines or Ising machines, are limited in many hardware devices. Therefore, when the bit-widths of the interaction and external magnetic field coefficients are larger than the annealing machines or Ising machines can handle, the bit-widths need to be reduced.

<Shift Method>

Figure 1:
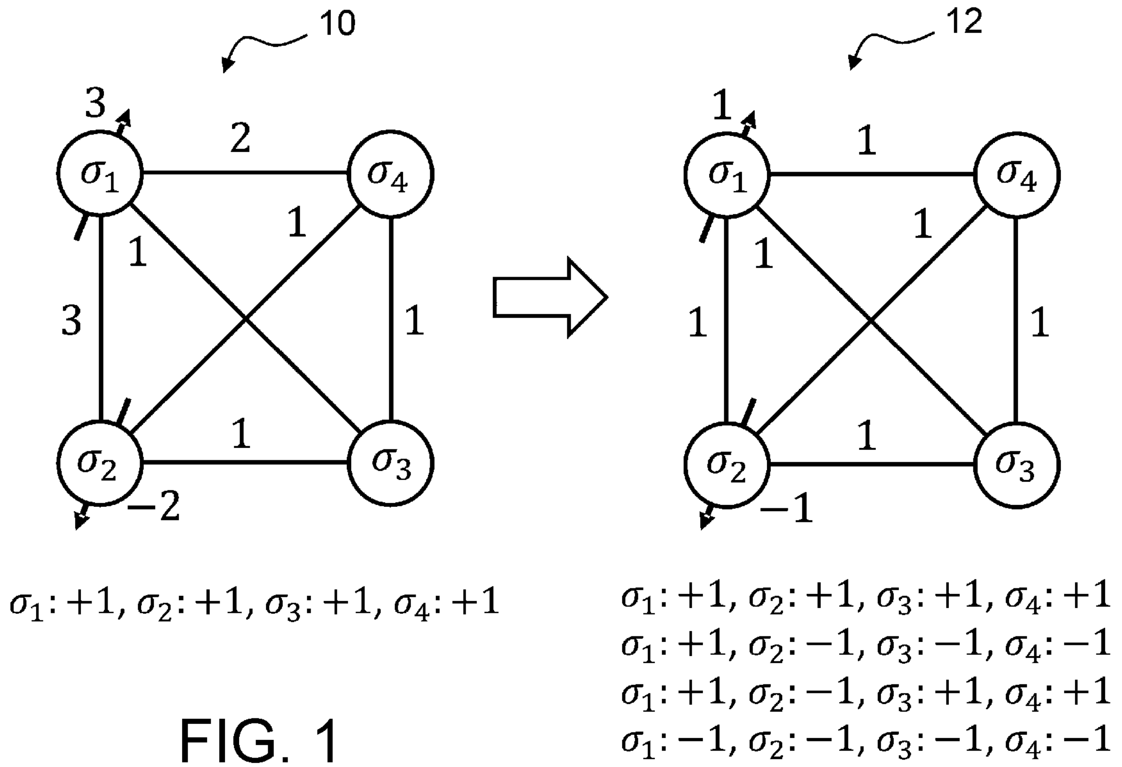
FIG. 1 is an illustration of an example of applying a shift method to an Ising model.

A shift method is a naive bit-width reduction method for an Ising model. FIG. 1 shows an example of an Ising model 10 defined in terms of four vertices and six edges. In the Ising model 10, $J_{1,2}=3$, $J_{1,4}=2$, $J_{2,3}=J_{2,4}=J_{3,4}=J_{1,3}=1$, $h_1=3$, $h_2=-2$, $h_3=h_4=0$. In FIG. 1, arrows on spins $\sigma_1$ and $\sigma_2$ represent orientations of the external magnetic fields. Spins of the ground state of the Ising model 10 become $(\sigma_1, \sigma_2, \sigma_3, \sigma_4)=(+1, +1, +1, +1)$.

Including a sign bit, the bit-width of values "2," "3," and "−2" is 3-bits, and the bit-width of a value "1" is 2-bits. The shift method reduces the number of bits by bit shift. By shifting the 3-bit values "2," "3," and "−2" of the Ising model 10 by 1-bit (right bit shift), 2-bit values "1," "1," and "−1" are obtained, respectively.

By applying the shift method to the Ising model 10 expressed in a bit-width of 3-bits [−3, +3] as described above, an Ising model 12 (right of FIG. 1) expressed in a bit-width of 2-bits [−1, +1] is obtained. However, as shown in FIG. 1, the Ising model 12 has four different ground states, one of which matches the ground state of the Ising model 10. Unfortunately, the ground states of both Ising models do not match exactly.

EMBODIMENTS

In the following embodiments, a technique for reducing a bit-width without changing a ground state of an Ising model is proposed.

First, referring to FIG. 2, a hardware configuration of a calculation device 100 for executing a calculation method of the embodiments will be described.

Figure 2:
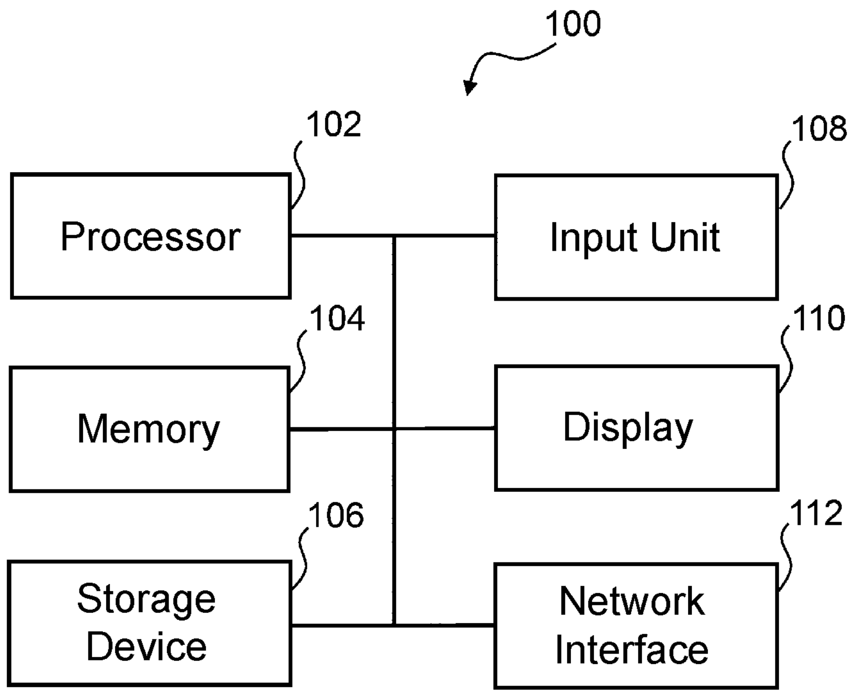
FIG. 2 is a block diagram of a hardware configuration for a calculation device according to embodiments.

As shown in FIG. 2, the calculation device 100 includes a processor 102, a memory 104, and a storage device 106, an input unit 108, a display 110, and a network interface 112, and these devices are connected via a bus.

The processor 102 includes a central processing unit (CPU) or other such device, and executes various processes in accordance with programs stored on the memory 104 and the storage device 106. The calculation method to be executed by the processor 102 will be detailed below.

As the processor 102, instead of employing a general-purpose computer such as CPU, a dedicated computer such as application specific integrated circuits (ASIC) or field programmable gate array (FPGA) for executing the calculation method of the embodiments may be employed.

The memory 104 includes a read only memory (ROM) and a random access memory (RAM). ROM stores a boot program such as BIOS. When the processor 102 reads out the program stored on ROM or the program stored on the storage device 106, these programs are loaded into RAM.

The storage device 106 includes a computer-readable storage medium, and stores a program for executing the calculation method of the embodiments, data required for the program execution, and other such data. Examples of the computer-readable storage medium include a hard disk drive (HDD), a solid state drive (SSD), and an optical disc.

Note that the programs to be executed by the processor 102 may be stored on an external computer connected via a network so that the processor 102 can read out the programs from the external computer via the network interface 112.

The input unit 108 includes an input device such as a mouse and a keyboard. The display 110 includes a liquid crystal display (LCD) or other such device, and displays results of the process executed by the processor 102.

The network interface 112 is an interface for connecting the calculation device 100 to a network such as a local area network (LAN), a wide area network (WAN), and/or the Internet.

Referring now to FIGS. 3 to 8, the calculation method that is executed by the processor 102 will be described.

Before explaining a method for reducing a bit-width of an interaction coefficient of an Ising model, a method which extends an interaction coefficient by adding an auxiliary spin will be described with reference to FIG. 3.

Figure 3:
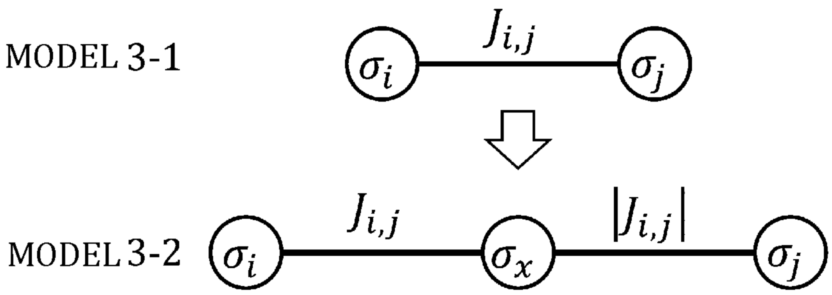
FIG. 3 is an illustration diagram of a method for extending an interaction coefficient.

As shown in FIG. 3, two spins $\sigma_i$ and $\sigma_j$ are assumed to be connected by an interaction coefficient $J_{i,j}$ in an Ising model (Model 3-1). First, an auxiliary spin $\sigma_x$ is added to Model 3-1. Next, an edge (i, x) between $\sigma_i$ and $\sigma_x$ and an edge (j, x) between $\sigma_j$ and $\sigma_x$ are added. The interaction coefficient $J_{i,j}$ and its absolute value $|J_{i,j}|$ are newly set on the added edges (i, x) and (j, x), respectively. By adding $\sigma_x$ to Model 3-1 to extend $J_{i,j}$ between $\sigma_i$ and $\sigma_j$ as described above, an extended Ising model (Model 3-2) is obtained.

Let an energy of the Ising model (Model 3-1) shown in FIG. 3 be denoted by $H_1$. The energy $H_1$ is represented by Equation (2). Terms which are independent of the interaction coefficient $J_{i,j}$ are omitted below.

$$H_1 = -J_{i,j}\sigma_i\sigma_j \quad (2)$$

Let an energy of the extended Ising model (Model 3-2) shown in FIG. 3 be denoted by $H'_1$. When $J_{i,j} \gg 0$, $H'_1$ is represented by Equation (3).

$$H_1' = -J_{i,j}\sigma_i\sigma_x - J_{i,j}\sigma_x\sigma_j = -J_{i,j}\sigma_x(\sigma_i + \sigma_j) \quad (3)$$

The auxiliary spin $\sigma_x$ takes the value of +1 or −1. Assuming that $\sigma_x$ takes the value which minimizes $H'_1$, Equation (3) is represented by Equation (4).

$$H_1' = -J_{i,j}|\sigma_i + \sigma_j| = -J_{i,j}(\sigma_i\sigma_j + 1) = -J_{i,j}\sigma_i\sigma_j - J_{i,j} \quad (4)$$

The energy difference between Model 3-1 and Model 3-2 (i.e., the difference between Equation (2) and Equation (4)) becomes $|J_{i,j}|$.

When $J_{i,j}<0$, $H'_1$ is represented by Equation (5).

$$H_1' = -J_{i,j}\sigma_i\sigma_x + J_{i,j}\sigma_x\sigma_j = -J_{i,j}\sigma_x(\sigma_i - \sigma_j) \quad (5)$$

Assuming that $\sigma_x$ takes the value which minimizes $H'_1$, Equation (5) is represented by Equation (6).

$$H'_1 = J_{i,j}|\sigma_i - \sigma_j| = J_{i,j}(-\sigma_i\sigma_j + 1) = -J_{i,j}\sigma_i\sigma_j + J_{i,j} \quad (6)$$

The energy difference between Model 3-1 and Model 3-2 (i.e., the difference between Equation (2) and Equation (6)) becomes $|J_{i,j}|$.

As described above, assuming that ax takes the value which minimizes $H'_1$, the energy difference between the original Ising model (Model 3-1) and the extended Ising model (Model 3-2) is always $|J_{i,j}|$. Hence, the energy difference between the ground state of Model 3-1 and the ground state of Model 3-2 has to be $|J_{i,j}$. The value of $|J_{i,j}|$ is independent of spin states and hence the spins $\sigma_i$ and $\sigma_j$ giving the ground state in Model 3-1 give also the ground state in Model 3-2. In other words, by adding the auxiliary spin and the edges to the original Ising model as shown in FIG. 3, the same ground state can be obtained when the focus is put on the original spins.

Figure 4:
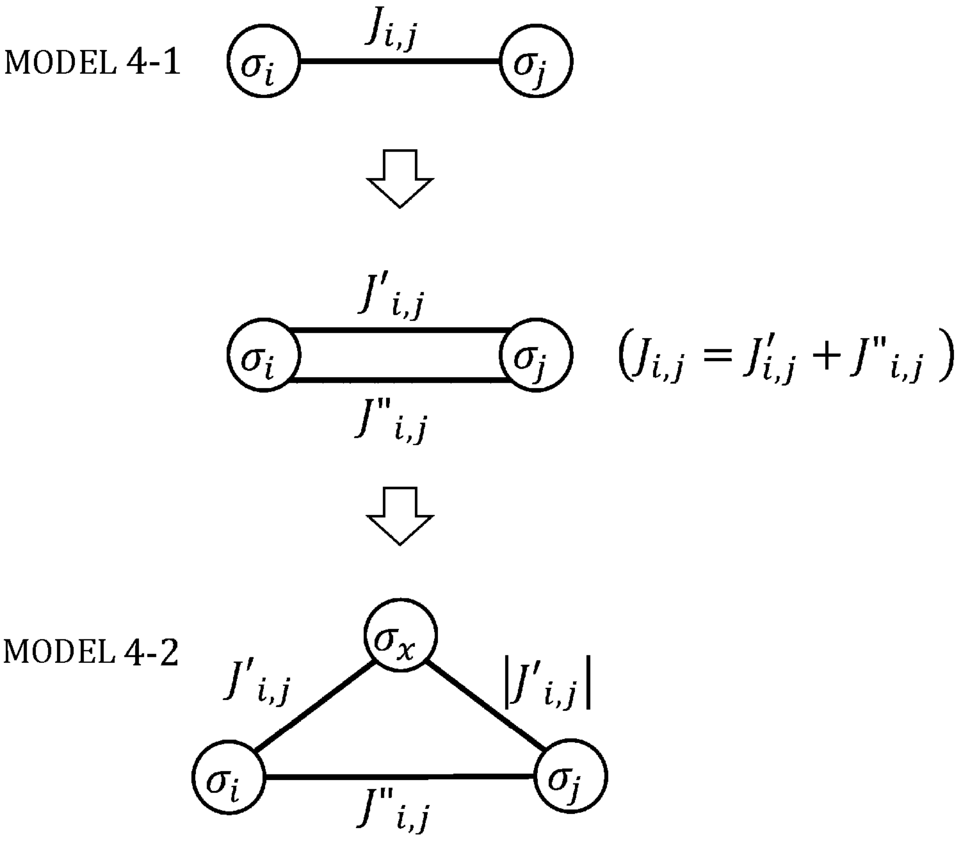
FIG. 4 is an illustration diagram of a method for reducing a bit-width of an interaction coefficient.

Next, the method for reducing a bit-width of an interaction coefficient will be described with reference to FIG. 4. As shown in FIG. 4, two spins $\sigma_i$ and $\sigma_j$ are assumed to be connected by an interaction coefficient $J_{i,j}$ in an Ising model (Model 4-1).

First, $J_{i,j}$ is partitioned into a first interaction coefficient $J'_{i,j}$ and a second interaction coefficient $J''_{i,j}$ such that $J_{i,j}=J'_{i,j}+J''_{i,j}$. As shown in FIG. 4, both $J'_{i,j}$ and $J''_{i,j}$ are provided to connect between $\sigma_i$ and $\sigma_j$. When the method which extends an interaction coefficient shown in FIG. 3 is applied to one of $J'_{i,j}$ and $J''_{i,j}$ ($J'_{i,j}$ in FIG. 4), an extended Ising model (Model 4-2) is obtained.

As described above, if an auxiliary spin which minimizes the energy of the extended Ising model is added to the original Ising model to extend the interaction coefficient, the extended Ising model shares the same ground state with the original Ising model. By repeating the process shown in FIG. 4 until the bit-width decreases to the point where the bit-width can be handled by the processor 102, it is possible to reduce the bit-width of the interaction coefficient of the original Ising model without changing the ground state.

For example, if $J_{i,j}=2J'_{i,j}$, an energy $H_{10}$ of Model 4-1 is represented by Equation (7). Terms which are independent of the interaction coefficient $J_{i,j}$ are omitted below.

$$H_{10}=-2J'_{i,j}\sigma_i\sigma_j \quad (7)$$

$J_{i,j}=2J'_{i,j}$ is partitioned into the same two interaction coefficients $J'_{i,j}$ ($J'_{i,j}=J''_{i,j}$). Let an energy of Model 4-2 be denoted by $H'_{10}$. When $J'_{i,j}>0$, $H'_{10}$ is represented by Equation (8).

$$H'_{10} = -J'_{i,j}\sigma_i\sigma_j - J'_{i,j}\sigma_i\sigma_x - J'_{i,j}\sigma_x\sigma_j = -J'_{i,j}\sigma_i\sigma_j - J'_{i,j}\sigma_x(\sigma_i + \sigma_j) \quad (8)$$

Since $\sigma_x$ takes the value which minimizes $H'_{10}$, Equation (8) is represented by Equation (9).

$$H'_{10} = -J'_{i,j}\sigma_i\sigma_j - J'_{i,j}|\sigma_i + \sigma_j| = -J'_{i,j}\sigma_i\sigma_j - J'_{i,j}(\sigma_i\sigma_j + 1) = -2J'_{i,j}\sigma_i\sigma_j - J'_{i,j} \quad (9)$$

From Equation (7) and Equation (9), $H_{10}=H'_{10}$ is satisfied except for a constant value $|J'_{i,j}|$ which does not depend on spins. That is, it is possible to reduce the bit-width of the interaction coefficient $J_{i,j}$ ($=2J'_{i,j}$) by 1-bit without changing the ground state.

When $J'_{i,j}<0$, the energy $H'_{10}$ of Model 4-2 is represented by Equation (10).

$$H'_{10} = -J'_{i,j}\sigma_i\sigma_j - J'_{i,j}\sigma_i\sigma_x + J'_{i,j}\sigma_x\sigma_j = -J'_{i,j}\sigma_i\sigma_j - J'_{i,j}\sigma_x(\sigma_i - \sigma_j) \quad (10)$$

Since $\sigma_x$ takes the value which minimizes $H'_{10}$, Equation (10) is represented by Equation (11).

$$H'_{10} = -J'_{i,j}\sigma_i\sigma_j + J'_{i,j}|\sigma_i - \sigma_j| = -J'_{i,j}\sigma_i\sigma_j + J'_{i,j}(-\sigma_i\sigma_j + 1) = -2J'_{i,j}\sigma_i\sigma_j + J'_{i,j} \quad (11)$$

From Equation (7) and Equation (11), $H_{10}=H'_{10}$ is satisfied except for a constant value $|J'_{i,j}|$ which does not depend on spins. That is, it is possible to reduce the bit-width of the interaction coefficient $J_{i,j}$ ($=2J'_{i,j}$) by 1-bit without changing the ground state.

Figure 5:
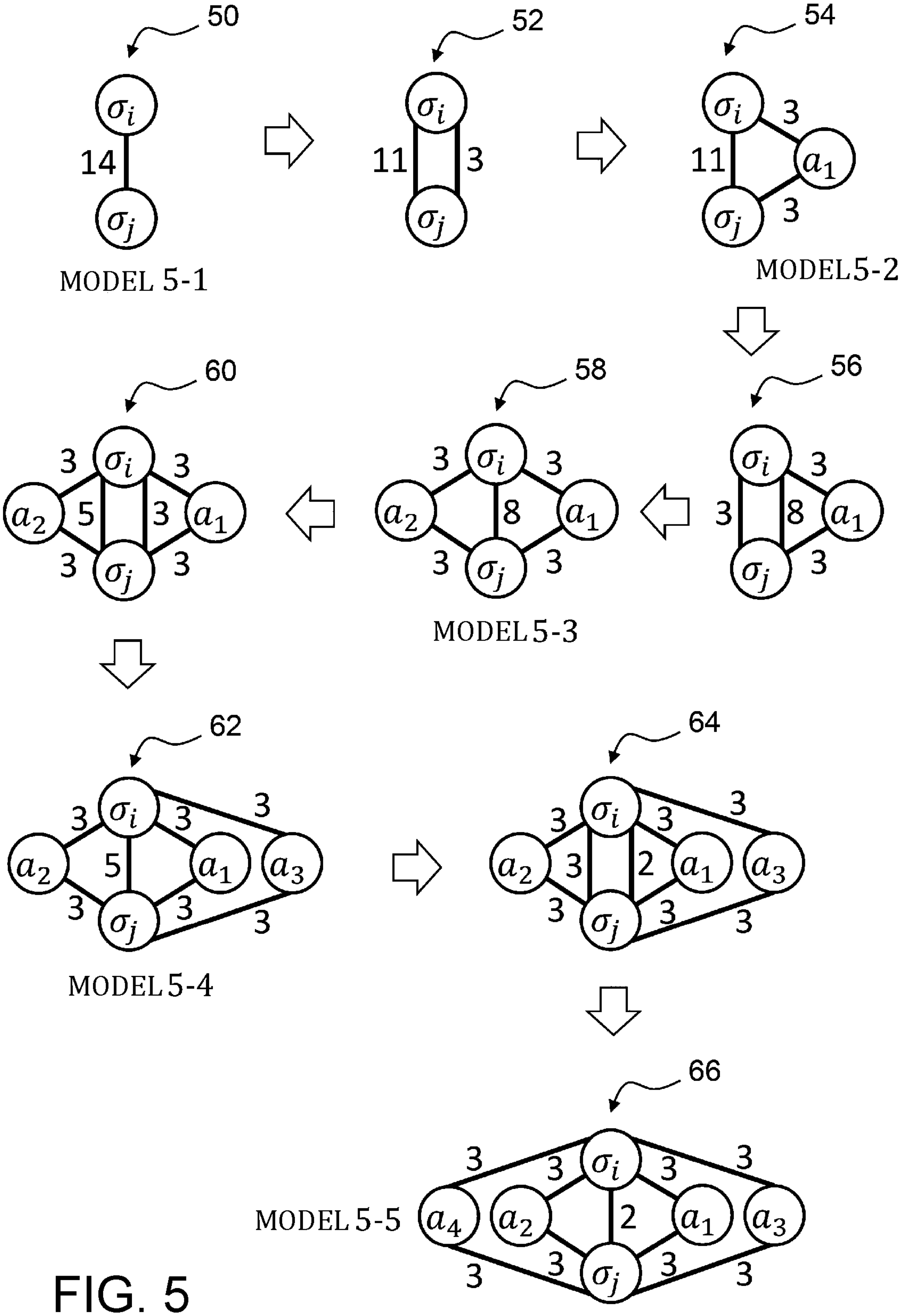
FIG. 5 is an illustration of an example of reducing a bit-width of an interaction coefficient.

Next, referring to FIG. 5, an example of reducing a bit-width of an interaction coefficient will be described. FIG. 5 shows the example of reducing a bit-width of an interaction coefficient $J_{i,j}$ between spins $\sigma_i$ and $\sigma_j$ from 5-bits (including a sign bit) to 3-bits.

Let a value of $J_{i,j}$ be "14" (5-bits including the sign bit) in an original Ising model (Model 5-1) (Step 50). First, "14" in Model 5-1 is partitioned into "3" (3-bits) and "11" (5-bits)

(Step 52). Then, an auxiliary spin $a_1$ is added for "3" connecting $\sigma_i$ and $\sigma_j$, an interaction coefficient between $a_1$ and $\sigma_j$ is set to be "3," and an interaction coefficient between $a_1$ and $\sigma_j$ is also set to be "3," thereby obtaining a new Ising model (Model 5-2) (Step 54).

Next, the value of $J_{i,j}$ "11" in Model 5-2 is partitioned into "3" (3-bits) and "8" (5-bits) (Step 56). Then, an auxiliary spin $a_2$ is added for "3" connecting $\sigma_i$ and $\sigma_j$, an interaction coefficient between $\sigma_i$ and $a_2$ is set to be "3," and an interaction coefficient between $a_2$ and $\sigma_j$ is also set to be "3," thereby obtaining a new Ising model (Model 5-3) (Step 58).

Next, the value of $J_{i,j}$ "8" in Model 5-3 is partitioned into "3" (3-bits) and "5" (4-bits) (Step 60). Then, an auxiliary spin $a_3$ is added for "3" connecting $\sigma_i$ and $\sigma_j$, an interaction coefficient between $\sigma_i$ and $a_3$ is set to be "3," and an interaction coefficient between $a_3$ and $\sigma_j$ is also set to be "3," thereby obtaining a new Ising model (Model 5-4) (Step 62).

Next, the value of $J_{i,j}$ "5" in Model 5-4 is partitioned into "3" and "2" (both of which are 3-bits) (Step 64). Then, an auxiliary spin $a_4$ is added for "3" connecting $\sigma_i$ and $\sigma_j$, an interaction coefficient between $\sigma_i$ and $a_4$ is set to be "3," and an interaction coefficient between $a_4$ and $\sigma_j$ is also set to be "3." Consequently, it is possible to obtain an extended Ising model (Model 5-5) in which all the interaction coefficients are expressed by 3-bits or less (Step 66).

Figure 6:
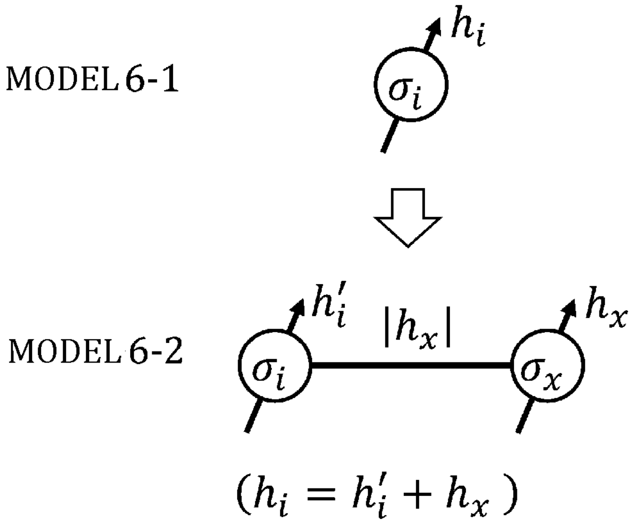
FIG. 6 is an illustration diagram of a method for reducing a bit-width of an external magnetic field coefficient.

Referring now to FIG. 6, a method for reducing a bit-width of an external magnetic field coefficient will be described. As shown in FIG. 6, let an Ising model (Model 6-1) have an external magnetic field coefficient $h_i$ acting on a spin $\sigma_i$.

Let $h_i$ be expressed in terms of sum of a first external magnetic field coefficient $h'_i$ and a second external magnetic field coefficient $h_x$ ($h_i=h'_i+h_x$). First, an auxiliary spin $\sigma_x$ is added to Model 6-1, $h'_i$ is set as an external magnetic field coefficient on $\sigma_i$, and $h_x$ is set as an external magnetic field coefficient on $\sigma_x$. Then, an edge (i, x) is added between $\sigma_i$ and $\sigma_x$, and an absolute value of the second external magnetic field coefficient $|h_x|$ is set as an interaction coefficient on the added edge (i, x). Consequently, an extended Ising model (Model 6-2) is obtained.

Next, a condition for matching a ground state of Model 6-2 to a ground state of Model 6-1 will be discussed.

Let an energy of Model 6-1 be denoted by $H_2$. $H_2$ is represented by Equation (12). Terms which are independent of the external magnetic field coefficient $h_i$ are omitted below.

$$H_2=-h_i\sigma_i \tag{12}$$

Let an energy of Model 6-2 be denoted by $H'_2$. When $h_x>0$ and $h_i>h_x$, $H'_2$ is represented by Equation (13).

$$\begin{aligned} H'_2 &= -h'_i\sigma_i - h_x\sigma_x - h_x\sigma_i\sigma_x \\ &= -h'_i\sigma_i - h_x\sigma_x(1+\sigma_i) \end{aligned} \tag{13}$$

Since $\sigma_i$ takes the value of +1 or −1, $(1+\sigma_i)$ in Equation (13) becomes 2 or 0, i.e., always takes a non-negative value. Hence, $H'_2$ is minimized when $\sigma_x=+1$, and Equation (13) is represented by Equation (14).

$$\begin{aligned} H'_2 &= -h'_i\sigma_i - h_x(1+\sigma_i) \\ &= -h'_i\sigma_i - h_x - h_x\sigma_i \\ &= -(h'_i+h_x)\sigma_i - h_x \\ &= -h_i\sigma_i - h_x \end{aligned} \tag{14}$$

The energy difference between Model 6-1 and Model 6-2 (i.e., the difference between Equation (12) and Equation (14)) becomes $|h_x|$.

When $h_x<0$ and $h_i<h_x$, $H'_2$ is represented by Equation (15).

$$\begin{aligned} H'_2 &= -h'_i\sigma_i - h_x\sigma_x + h_x\sigma_i\sigma_x \\ &= -h'_i\sigma_i - h_x\sigma_x(1-\sigma_i) \end{aligned} \tag{15}$$

Since $\sigma_i$ takes the value of +1 or −1, $(1-\sigma_i)$ in Equation (15) becomes 0 or 2, i.e., always takes a non-negative value. Hence, $H'_2$ is minimized when $\sigma_x=-1$, and Equation (15) is represented by Equation (16).

$$\begin{aligned} H'_2 &= -h'_i\sigma_i + h_x(1-\sigma_i) \\ &= -h'_i\sigma_i + h_x - h_x\sigma_i \\ &= -(h'_i+h_x)\sigma_i + h_x \\ &= -h_i\sigma_i + h_x \end{aligned} \tag{16}$$

The energy difference between Model 6-1 and Model 6-2 (i.e., the difference between Equation (12) and Equation (16)) becomes $|h_x|$.

As described above, assuming that ax takes the value which minimizes $H'_2$, the energy difference between the original Ising model (Model 6-1) and the extended Ising model (Model 6-2) is always $|h_x|$. Hence, the energy difference between the ground state of Model 6-1 and the ground state of Model 6-2 has to be $|h_x|$. The value of $|h_x|$ is independent of spin states and hence the spin $\sigma_i$ giving the ground state in Model 6-1 gives also the ground state in Model 6-2. In other words, by adding the auxiliary spin and the edge to the original Ising model as shown in FIG. 6, the same ground state can be obtained when the focus is put on the original spin.

By repeating the process shown in FIG. 6 until the bit-width decreases to the point where the bit-width can be handled by the processor 102, it is possible to reduce the bit-width of the external magnetic field coefficient of the original Ising model without changing the ground state.

Figure 7:
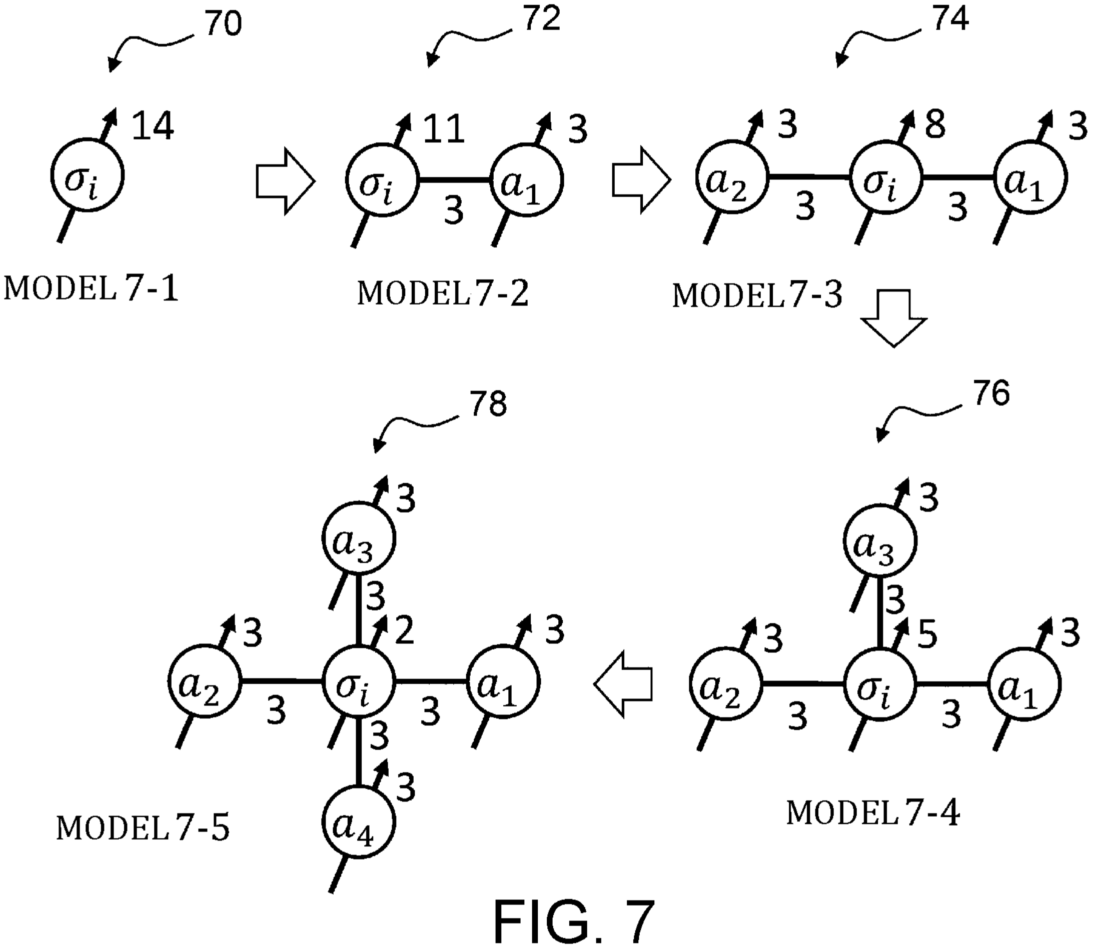
FIG. 7 is an illustration of an example of reducing a bit-width of an external magnetic field coefficient.

Next, referring to FIG. 7, an example of reducing a bit-width of an external magnetic field coefficient will be described. FIG. 7 shows the example of reducing a bit-width of an external magnetic field coefficient $h_i$ acting on a spin $\sigma_i$ from 5-bits (including a sign bit) to 3-bits.

Let a value of $h_i$ be "14" (5-bits including the sign bit) in an original Ising model (Model 7-1) (Step 70). Since the value of $h_i$ "14" in Model 7-1 is expressed in terms of sum of "3" (3-bits) and "11" (5-bits), an auxiliary spin $a_1$ is added first to Model 7-1, an external magnetic field coefficient on $\sigma_i$ is set to be "11," and an external magnetic field coefficient on $a_1$ is set to be "3." Then, an edge is added between $\sigma_i$ and $a_1$, and a new interaction coefficient on the added edge is set to be "3," thereby obtaining a new Ising model (Model 7-2) (Step 72).

Since the value of $h_i$ "11" in Model 7-2 is expressed in terms of sum of "3" (3-bits) and "8" (5-bits), an auxiliary spin $a_2$ is then added to Model 7-2, an external magnetic field coefficient on $\sigma_i$ is set to be "8," and an external magnetic field coefficient on $a_2$ is set to be "3." Then, an edge is added between $\sigma_i$ and $a_2$, and a new interaction coefficient on the added edge is set to be "3," thereby obtaining a new Ising model (Model 7-3) (Step 74).

Since the value of $h_i$ "8" in Model 7-3 is expressed in terms of sum of "3" (3-bits) and "5" (4-bits), an auxiliary spin $a_3$ is then added to Model 7-3, an external magnetic field coefficient on $\sigma_i$ is set to be "5," and an external magnetic field coefficient on $a_3$ is set to be "3." Then, an edge is added between $\sigma_i$ and $a_3$, and a new interaction coefficient on the added edge is set to be "3," thereby obtaining a new Ising model (Model 7-4) (Step 76).

Since the value of $h_i$ "5" in Model 7-4 is expressed in terms of sum of "3" and "2" (both of which are 3-bits), an auxiliary spin $a_4$ is then added to Model 7-4, an external magnetic field coefficient on $\sigma_i$ is set to be "2," and an external magnetic field coefficient on $a_4$ is set to be "3." Then, an edge is added between $\sigma_i$ and $a_4$, and a new interaction coefficient on the added edge is set to be "3." Consequently, it is possible to obtain an extended Ising model (Model 7-5) in which all the external magnetic field coefficients are expressed by 3-bits or less (Step 78).

By the calculation method of the embodiments, it is possible to formulate the number of auxiliary spins to be added when bit-widths of an original Ising model are reduced by 1-bit.

Let $J_{i,j}$ and $h_i$ of the original Ising model be represented by n-bits including a sign bit and be reduced by 1-bit to become any (n−1)-bit integer (n−1≥2) within the range of $[-(2^{n-2}-1), 2^{n-2}-1]$.

Let the number of auxiliary spins to be added when $J_{i,j}$ is reduced by 1-bit be denoted by $s_{i,j}$. $s_{i,j}$ is represented by Equation (17).

$$s_{i,j} = \left\lceil \frac{|J_{i,j}|}{2^{n-2}-1} \right\rceil - 1 \qquad (17)$$

Let the number of auxiliary spins to be added when $h_i$ is reduced by 1-bit be denoted by $s_i$. $s_i$ is represented by Equation (18)

$$s_i = \left\lceil \frac{|h_i|}{2^{n-2}-1} \right\rceil - 1 \qquad (18)$$

From Equation (17) and Equation (18), when the Ising model whose bit-width is represented by n-bits is reduced by 1-bit using the calculation method of the embodiments, the total number s of auxiliary spins to be added is represented by Equation (19).

$$s = \sum_{(i,j)\in E} s_{i,j} + \sum_{i\in V} s_i \qquad (19)$$

Figure 8:
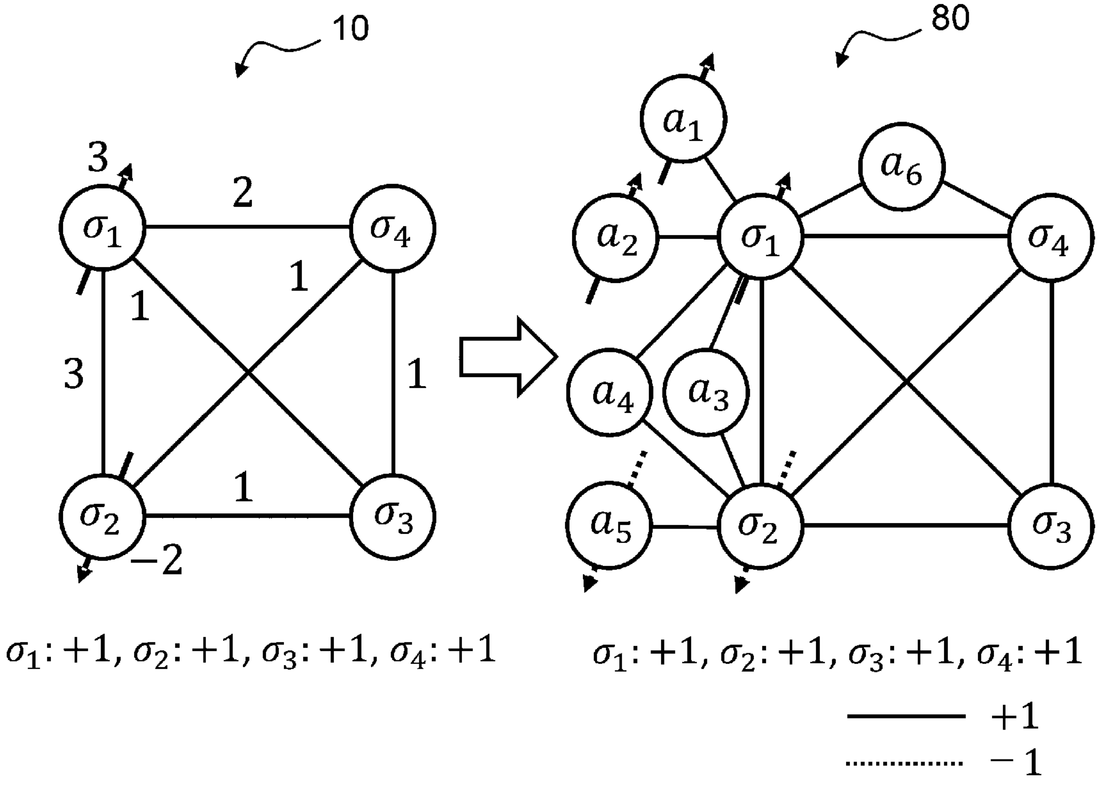
FIG. 8 is an illustration of an example of applying a calculation method of the embodiments to an Ising model.

As shown in FIG. 8, by applying the calculation method of the embodiments to the Ising model 10 expressed in a bit-width of 3-bits ([−3, +3]) shown in FIG. 1 to reduce the bit-width by 1-bit, an extended Ising model 80 (right of FIG. 8) is obtained which is expressed in a bit-width of 2-bits [−1, +1].

In the extended Ising model 80 shown in FIG. 8, solid edges mean that interaction coefficients are +1, solid arrows mean that external magnetic field coefficients are +1, and dotted arrows mean that external magnetic field coefficients are −1.

From Equation (17) to Equation (19), the total number s of the auxiliary spins added to the Ising model 10 is 6. Specifically, auxiliary spins $a_1$ and $a_2$ are added to reduce $h_1$ (=3) by 1-bit, auxiliary spins $a_3$ and $a_4$ are added to reduce $J_{1,2}$ (=3) by 1-bit, an auxiliary spin $a_5$ is added to reduce $h_2$ (=−2) by 1-bit, and an auxiliary spin $a_6$ is added to reduce $J_{1,4}$ (=2) by 1-bit, thereby obtaining the extended Ising model 80.

In the extended Ising model 80, $J_{1,2}=J_{1,3}=J_{1,4}=J_{2,3}=J_{2,4}=J_{3,4}=+1$, $h_1=+1$, $h_2=-1$, and $h_3=h_4=0$. Consequently, the spins of the ground state of the extended Ising model 80 become $(\sigma_1, \sigma_2, \sigma_3, \sigma_4)=(+1, +1, +1, +1)$ except for the auxiliary spins, and thus match the spins of the ground state of the original Ising model 10.

Examples of applying the calculation method of the embodiments to random Ising models and two combinatorial optimization problems (number partition problem and vertex cover problem) will now be described below.

<Random Ising Model>

An assumption is made that the following random Ising model is a connected graph obtained by randomly generating vertices and edges, the number of vertices ranges from 5 to 20, and the edge density is set to be around 1.0. The interaction coefficients and the external magnetic field coefficients are assumed to be randomly generated such that their values take a uniform distribution of a given bit-width. The bit-width is assumed to range from 5-bits to 11-bits.

Table 1 shows examples of applying the calculation method of the embodiments to Ising models which are randomly generated as described above.

TABLE 1

| Name | Bit width | #Spins #Reduction bits 0 | 1 | 2 | 3 | 4 | 5 | 6 | 7 | 8 | 9 |
|---|---|---|---|---|---|---|---|---|---|---|---|
| #1 (\|V\| = 5, E\| = 10) | 5 | 5 | 15 | 34 | 109 | | | | | | |
| #2 (\|V\| = 5, E\| = 10) | 6 | 5 | 16 | 37 | 88 | 271 | | | | | |
| #3 (\|V\| = 7, E\| = 21) | 6 | 7 | 19 | 48 | 118 | 363 | | | | | |
| #4 (\|V\| = 10, \|E\| = 45) | 6 | 10 | 43 | 118 | 291 | 909 | | | | | |
| #5 (\|V\| = 10, \|E\| = 44) | 7 | 10 | 33 | 87 | 203 | 495 | 1527 | | | | |
| #6 (\|V\| = 13, \|E\| = 78) | 7 | 13 | 52 | 152 | 359 | 882 | 2703 | | | | |
| #7 (\|V\| = 13, \|E\| = 78) | 8 | 13 | 52 | 121 | 280 | 638 | 1523 | 4630 | | | |
| #8 (\|V\| = 13, \|E\| = 77) | 9 | 13 | 55 | 145 | 330 | 708 | 1554 | 3660 | 11050 | | |
| #9 (\|V\| = 15, \|E\| = 103) | 9 | 15 | 76 | 204 | 455 | 998 | 2181 | 5154 | 15544 | | |
| #10 (\|V = 15, E\| = 105) | 10 | 15 | 68 | 189 | 412 | 880 | 1868 | 4054 | 9526 | 28675 | |
| #11 (\|V = 20, E\| = 190) | 11 | 20 | 117 | 327 | 754 | 1602 | 3331 | 6982 | 15043 | 35218 | 105825 |

In Table 1, #1 to #11 in "Name" column indicate graphs of different Ising models. In "Name" column, |V| indicates the number of vertices, and |E| indicates the number of edges. "Bit-Width" column indicates the bit-widths of the original Ising models. "#Reduction bits" column indicates the number of bits reduced by applying the calculation method of the embodiments to the original Ising models. "#Spins" column indicates the total number of spins of the extended Ising models after reducing the bit-widths of the original Ising models. When the number of the reduction bits is "0," the total number of spins is identical to that of the original Ising models. A blank in "#Spins" column indicates that the bit-widths cannot be reduced anymore. Tables described below share the same structure with Table 1.

For example, in Table 1, the Ising model of #1 has five vertices, ten edges, and a bit-width of 5-bits. By applying the calculation method of the embodiments to the Ising model of #1, the total number of spins becomes 15 when the bit-width is reduced by 1-bit, the total number of spins becomes 34 when the bit-width is reduced by 2-bits, and the total number of spins becomes 109 when the bit-width is reduced by 3-bits. Table 1 indicates that the more reduced the bit-widths of the Ising models of #1 to #11, the larger the total number of spins.

<Number Partition Problem>

The number partition problem (hereinafter referred to as NPP) is defined as follows: Given $M=\{m_1, m_2, \ldots, m_N\}$ as a set of N natural numbers, partition M into two subsets $M_i$ and $M_2$, and judge whether the sum of natural numbers belonging to $M_1$ and the sum of natural numbers belonging to $M_2$ are the same or not. NPP is known to be NP-complete.

For example, given a set $M=\{1, 2, 4, 7\}$, M is partitioned into subsets $M_1=\{1, 2, 4\}$ and $M_2=\{7\}$. The sum of natural numbers in $M_1$ is equal to that in $M_2$.

NPP can be expressed in terms of Ising models. N spins $\sigma_i$ ($N=|M|$, $1 \le i \le N$) are prepared, and the energy function (or Hamiltonian) is denoted by $H_{NPP}$. NPP can be formulated into an Ising model as given by Equation (20) and Equation (21).

$$H_{NPP} = \left(\sum_{i=1}^{N} m_i \sigma_i\right)^2 \tag{20}$$

$$\sigma_i = \begin{cases} 1 & m_i \text{ is assigned to a subset } M_1. \\ -1 & m_i \text{ is assigned to a subset } M_2. \end{cases} \tag{21}$$

As shown in Equation (21), $\sigma_i$ ($1 \le i \le N$) becomes +1 when $m_i$ is assigned to the subset $M_1$, and becomes −1 when $m_i$ is assigned to the subset $M_2$. The minimum value of $H_{NPP}$ is zero in Equation (20). When $H_{NPP}$ is zero, the sum of natural numbers belonging to $M_1$ and the sum of natural numbers belonging to $M_2$ are the same.

Figure 9:
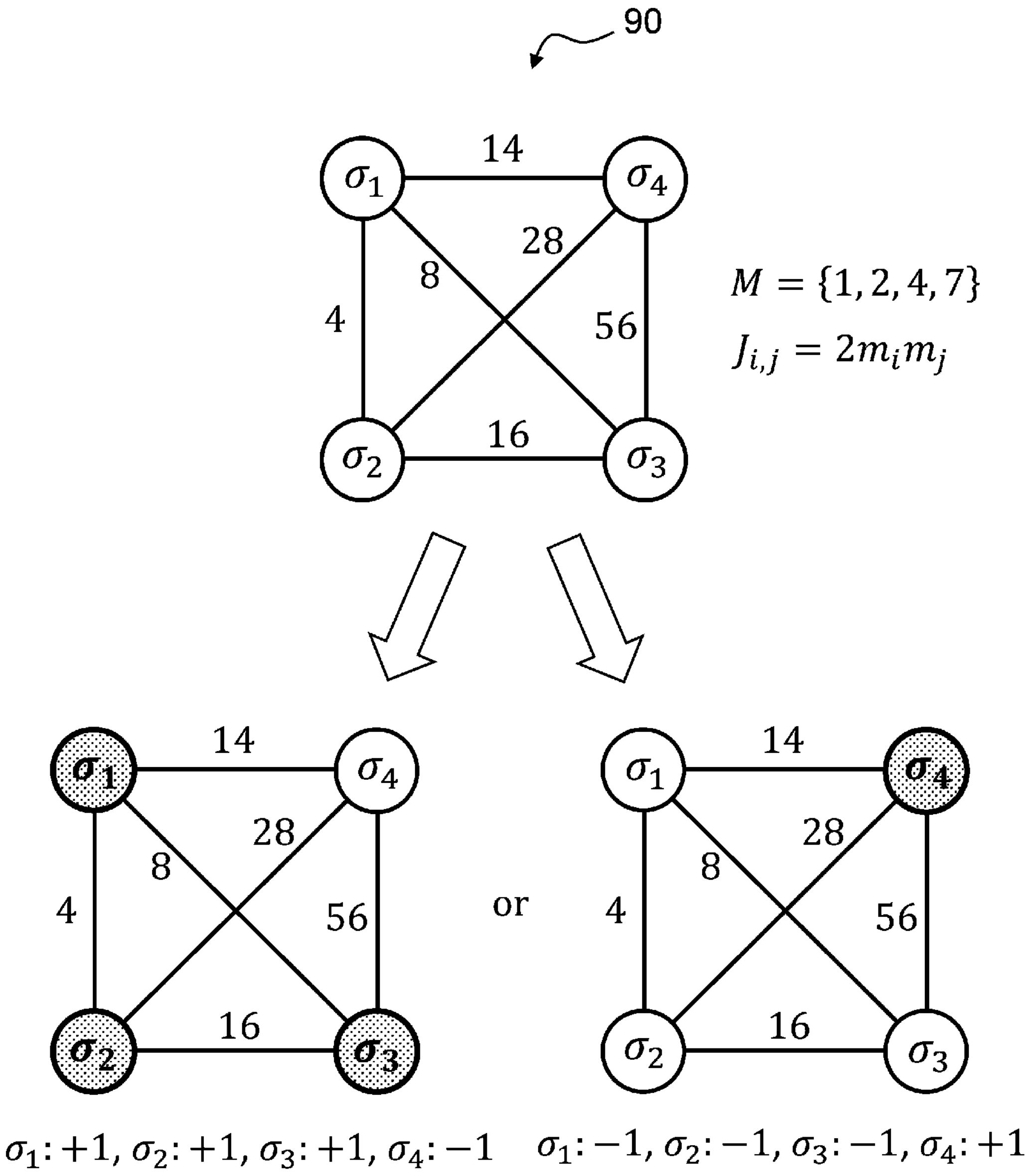
FIG. 9 is an illustration of an example of a number partition problem expressed in terms of an Ising model.

FIG. 9 shows an example of NPP expressed in terms of the Ising model when the set $M=\{1, 2, 4, 7\}$ is given as described above. From Equation (20), an interaction coefficient $J_{i,j}$ of the Ising model 90 shown in FIG. 9 is $2m_i m_j$. A spin $\sigma_i$ ($1 \le i \le N$) corresponds to $m_i$ ($1 \le i \le N$). As described above, the set M can be partitioned into $M_1=\{1, 2, 4\}$ and $M_2=\{7\}$, and $H_{NPP}$ takes the minimum value when $(\sigma_1, \sigma_2, \sigma_3, \sigma_4)=(+1, +1, +1, -1)$ or $(\sigma_1, \sigma_2, \sigma_3, \sigma_4)=(-1, -1, -1, +1)$ as shown in FIG. 9.

Table 2 shows examples of applying the calculation method of the embodiments to Ising models for NPPs.

TABLE 2

| | Bit | #Spins #Reduction bits | | | | | | | | | | | | |
|---|---|---|---|---|---|---|---|---|---|---|---|---|---|---|
| Name | width | 0 | 1 | 2 | 3 | 4 | 5 | 6 | 7 | 8 | 9 | 10 | 11 | 12 |
| #12 ($\{i \mid i \in [1, 3]\}$) | 5 | 3 | 4 | 8 | 22 | | | | | | | | | |
| #13 ($\{f(1, j) \mid j \in [0, 4]\}$) | 6 | 5 | 7 | 14 | 33 | 99 | | | | | | | | |
| #14 ($\{1, 2, 4, 7\}$) | 7 | 4 | 5 | 9 | 18 | 43 | 124 | | | | | | | |
| #15 ($\{f(2, j) \mid j \in [0, 4]\}$) | 8 | 5 | 7 | 13 | 28 | 60 | 137 | 411 | | | | | | |
| #16 ($\{i \mid i \in [1, 8]\}$) | 8 | 8 | 14 | 30 | 66 | 146 | 352 | 1072 | | | | | | |
| #17 ($\{i \mid i \in [1, 12]\}$) | 10 | 12 | 13 | 28 | 68 | 154 | 337 | 749 | 1772 | 5380 | | | | |
| #18 ($\{f(3, j) \mid j \in [0, 5]\}$) | 11 | 6 | 10 | 11 | 21 | 40 | 83 | 174 | 378 | 879 | 2655 | | | |
| #19 ($\{i \mid i \in [1, 20]\}$) | 11 | 20 | 36 | 102 | 257 | 583 | 1256 | 2656 | 5795 | 13620 | 41060 | | | |
| #20 ($\{f(1, j) \mid j \in [0, 10]\}$) | 15 | 11 | 12 | 14 | 21 | 38 | 76 | 154 | 313 | 639 | 1307 | 2716 | 5836 | 13644 |
| #21 ($\{f(10, j) \mid j \in [0, 10]\}$) | 21 | 11 | 13 | 18 | 31 | 59 | 120 | 243 | 488 | 990 | 1988 | 3991 | 8008 | 16063 |
| #22 ($\{f(1, j) \mid j \in [0, 20]\}$) | 29 | 21 | 24 | 31 | 47 | 77 | 151 | 291 | 587 | 1180 | 2371 | 4754 | 9541 | 16063 |
| #23 ($\{f(1, j) \mid j \in [0, 23]\}$) | 33 | 24 | 25 | 27 | 35 | 52 | 90 | 171 | 335 | 667 | 1323 | 2668 | 5335 | 10699 |

In Table 2, #12 to #23 in "Name" column indicate different sets M. A set M of N natural numbers (N mod 3=0 or 2) is created based on f (i, j) defined by Equation (22) which is the Fibonacci sequence. When sets M are created based on Equation (22), NPPs always have solutions.

$$f(i, j) = \begin{cases} f(i, j-2) + f(i, j-1) & 2 \le j \\ i & j = 0 \text{ or } 1, \\ 0 & \text{others} \end{cases} \tag{22}$$

#13, #15, #18, and #20 to #23 in Table 2 indicate the sets created based on f(i, j) of Equation (22). The set of #14 corresponds to the Ising model 90 with the bit-width of 7-bits shown in FIG. 9. For example, by applying the calculation method of the embodiments to the Ising model 90, the total number of spins becomes 5 when the bit-width is reduced by 1-bit, and the total number of spins becomes 124 when the bit-width is reduced by 5-bits. Thus, the bit-width reduction for NPPs by the calculation method of the embodiments is also found to increase in the total number of spins.

<Vertex Cover Problem>

A vertex cover of an undirected graph G=(V, E) is defined such that at least one of vertices that constitute each edge in E is included in a subset of vertices $V' \subseteq V$. The vertex cover problem (hereinafter referred to as VCP) is to find the smallest size of V' and is known to be NP-hard.

Figure 10:
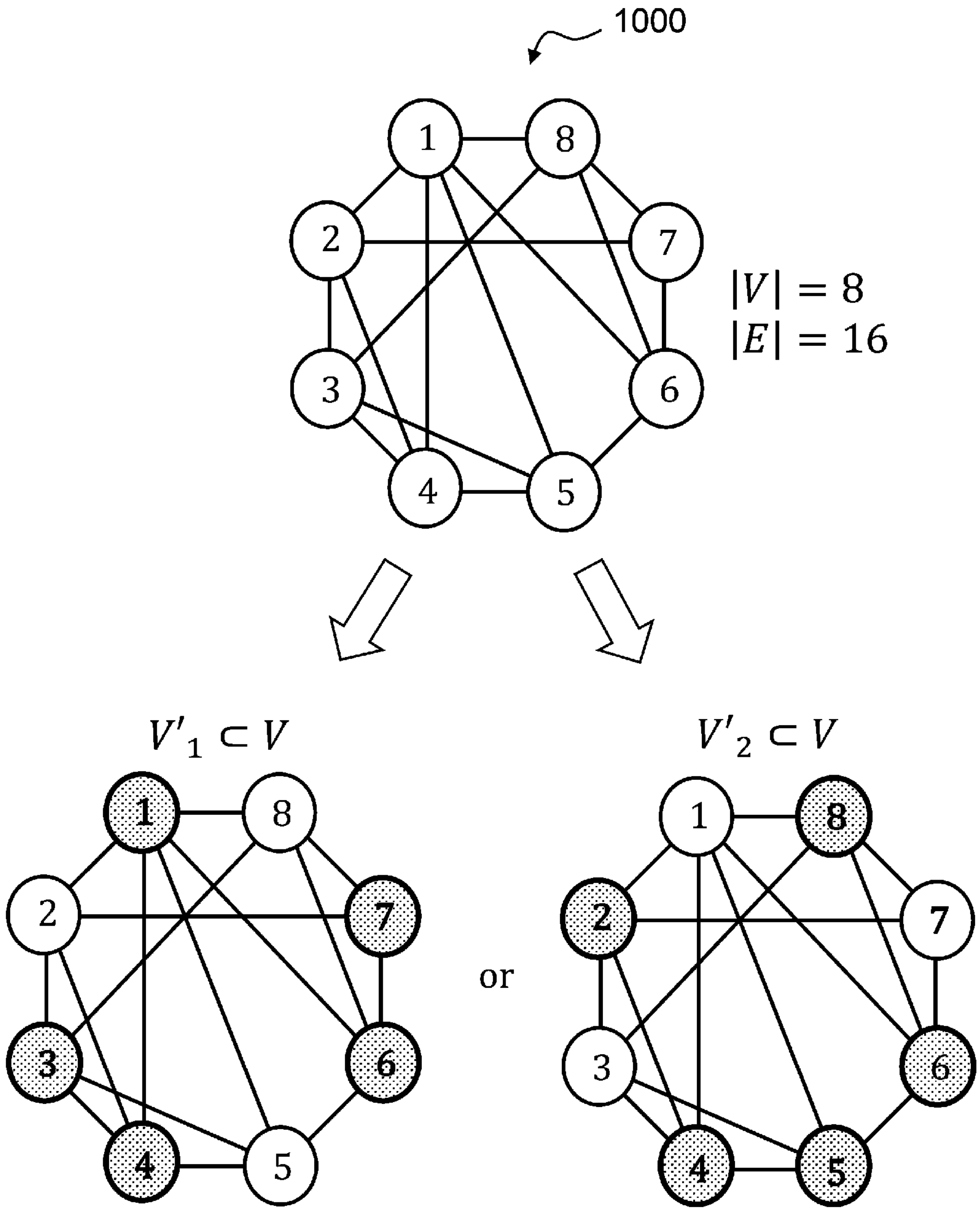
FIG. 10 is an illustration of an example of a vertex cover problem and its optimal solutions.

FIG. 10 shows an example of VCP. A graph 1000 shown in FIG. 10 has eight vertices (1 to 8) and sixteen edges. The smallest size of V' of the graph 1000 is a set of five vertices: a subset $V'_1$ of vertices 1, 3, 4, 6, and 7, and a subset $V'_2$ of vertices 2, 4, 5, 6, and 8. In other words, at least one of vertices that constitute each edge of the graph 1000 is included in $V'_1$ or $V'_2$.

VCP can also be expressed in terms of Ising models. N spins $\sigma_i$ ($N=|V|$, $1 \le i \le N$) are prepared, and the energy function (or Hamiltonian) is denoted by $H_{VCP}$. VCP can be formulated into an Ising model as given by Equation (23) and Equation (24).

$$H_{VCP} = \alpha_{VCP} \sum_{(i,j)\in E} (1-\sigma_i)(1-\sigma_j) + \beta_{VCP} \sum_{i \in V} \sigma_i \tag{23}$$

$$\sigma_i = \begin{cases} 1 & \text{Vertex } i \in V \text{ is in } V'. \\ -1 & \text{Vertex } i \in V \text{ is not in } V'. \end{cases} \tag{24}$$

In Equation (23), $\alpha_{VCP}$ and $\beta_{VCP}$ are positive weight parameters. As shown in Equation (24), $\sigma_i$ ($1 \le i \le N$) becomes +1 when a vertex i belongs to V', and becomes −1 when a vertex i does not belong to V'.

The first and second terms in Equation (23) indicate a penalty function and an objective function, respectively. When at least one of vertices that constitute each edge in E belongs to V', the first term in Equation (23) becomes zero. If the size of V' is the smallest, $H_{VCP}$ is minimized when the second term of Equation (23) is minimized, and thus optimal solutions can be obtained. Note that $\beta_{VCP} \le \alpha_{VCP}$ is set to obtain solutions satisfying the constraints called feasible solutions.

Table 3 shows examples of applying the calculation method of the embodiments to Ising models for VCPs.

TABLE 3

| Name | Bit width | #Spins #Reduction bits 0 | 1 |
|---|---|---|---|
| se 1 (V\| = 8, \|E = 20) | 3 | 8 | 14 |
| cage 1 (\|V\| = 10, \|E = 30) | 3 | 10 | 20 |
| cage 2 (\|V\| = 14, \|E = 42) | 3 | 14 | 28 |
| se 2 (V\| = 16, \|E\| = 42) | 3 | 16 | 28 |
| cage 3 (\|V\| = 24, \|E = 72) | 3 | 24 | 48 |
| ccc 1 (\|V\| = 24, \|E = 72) | 3 | 24 | 48 |
| bfly 1 (V\| = 24, E\| = 96) | 3 | 24 | 72 |

"Name" column in Table 3 indicates benchmark graphs which are picked up from AG-Monien Graph Collection on a website below.

"AG-Monien—SuiteSparse matrix collection," https://sparse.tamu.edu/AG-Monien.

Both $\alpha_{VCP}$ and $\beta_{VCP}$ are set to be one in all the graphs in Table 3.

Reduction in the bid-width of each graph shown in Table 3 by 1-bit using the calculation method of the embodiments is also found to increase the total number of spins.

Annealing machines or Ising machines have predetermined number of spins, and can work successfully if the number of spins is not greater than the predetermined number. In fact, as for Table 1 to Table 3, the processor 102 is able to accurately obtain the ground states when the total number of spins does not exceed the predetermined number for the processor 102.

Next, for comparison with the calculation method of the embodiments, Table 4, Table 5, and Table 6 show results of applying the naïve method (shift method) to random Ising models, NPPs, and VCPs, respectively.

TABLE 4

| Name | Bit width | #Ground states by naive method/#Original ground states matched #Reduction bits 0 | 1 | 2 | 3 | 4 | 5 | 6 | 7 | 8 | 9 |
|---|---|---|---|---|---|---|---|---|---|---|---|
| #1 | 5 | 1/1 | 2/1 | 1/0 | 1/0 | | | | | | |
| #2 | 6 | 1/1 | **1/1** | 1/1 | **1/1** | 1/0 | | | | | |
| #3 | 6 | 1/1 | **1/1** | 1/1 | 2/1 | 1/0 | | | | | |
| #4 | 6 | 1/1 | **1/1** | 1/1 | **1/1** | 1/1 | | | | | |
| #5 | 7 | 1/1 | **1/1** | 1/1 | **1/1** | 1/1 | 1/0 | | | | |
| #6 | 7 | 1/1 | **1/1** | 1/1 | **1/1** | 1/0 | 2/0 | | | | |
| #7 | 8 | 1/1 | **1/1** | 1/1 | **1/1** | 1/1 | **1/1** | 8/0 | | | |
| #8 | 9 | 1/1 | **1/1** | 1/1 | **1/1** | 1/1 | **1/1** | 1/0 | 1/0 | | |
| #9 | 9 | 1/1 | **1/1** | 1/1 | **1/1** | 1/1 | **1/1** | 1/0 | 1/0 | | |
| #10 | 10 | 1/1 | **1/1** | 1/1 | **1/1** | 1/1 | **1/1** | 1/1 | 2/1 | 1/0 | |
| #11 | 11 | 1/1 | **1/1** | 1/1 | 2/1 | 1/0 | 2/1 | 1/1 | 1/1 | 1/1 | 5/1 |

TABLE 5

| Name | Bit width | #Ground states by naive method/#Original ground states matched #Reduction bits 0 and 1 | 2 | 3 | 4 | 5 | 6 | 7 | 8 | 9 | 10 | 11 | 12 |
|---|---|---|---|---|---|---|---|---|---|---|---|---|---|
| #12 | 5 | 2/2 | 4/2 | 6/2 | | | | | | | | | |
| #13 | 6 | **4/4** | 4/4 | 6/4 | 20/4 | | | | | | | | |
| #14 | 7 | 2/2 | 4/2 | 2/0 | 4/0 | 6/0 | | | | | | | |
| #15 | 8 | **4/4** | 4/4 | 4/4 | 4/4 | 6/4 | 20/4 | | | | | | |
| #16 | 8 | **14/14** | 2/2 | 8/4 | 8/2 | 14/4 | 70/8 | | | | | | |
| #17 | **10** | 124/124 | 4/0 | 24/8 | 26/4 | 2/0 | 10/0 | 504/40 | 924/58 | | | | |
| #18 | **11** | **4/4** | 2/2 | 2/2 | 2/2 | 6/2 | 6/2 | 2/2 | 12/2 | 20/2 | | | |
| #19 | **11** | 15272/15272 | 6/0 | 6/6 | 8/0 | 2/2 | 4/0 | 2/0 | 1584/92 | 184756/5448 | | | |
| #20 | **15** | 16/16 | 16/16 | 4/0 | 20/8 | 6/0 | 8/4 | 4/0 | 2/0 | 12/0 | **42/0** | 252/12 | 504/12 |
| #21 | 21 | 16/16 | 16/16 | 16/16 | **16/16** | 8/8 | 8/8 | 6/4 | 14/8 | 6/4 | **2/0** | 2/0 | 6/0 |

TABLE 5-continued

| Name | Bit width | #Ground states by naive method/#Original ground states matched #Reduction bits 0 and 1 | 2 | 3 | 4 | 5 | 6 | 7 | 8 | 9 | 10 | 11 | 12 |
|---|---|---|---|---|---|---|---|---|---|---|---|---|---|
| #22 | 29 | 128/128 | 2/2 | 6/0 | 4/2 | 2/0 | 14/2 | 4/0 | 8/0 | 2/0 | 4/0 | 10/0 | 2/0 |
| #23 | 33 | 256/256 | 2/2 | 2/0 | 2/0 | 2/0 | 12/0 | 2/0 | 6/0 | 2/0 | 6/0 | 2/0 | 8/0 |

TABLE 6

| Name | Bit width | #Ground states by naive method/ #Original ground states matched #Reduction bits 0 | 1 |
|---|---|---|---|
| se 1 | 3 | 2/2 | 2/2 |
| cage 1 | 3 | 5/5 | 5/5 |
| cage 2 | 3 | 2/2 | 2/2 |
| se 2 | 3 | 30/30 | 16/8 |
| cage 3 | 3 | 8/8 | 18/8 |
| ccc 1 | 3 | 828/828 | 11682/828 |
| bfly 1 | 3 | 177/177 | 6/0 |

Contents of "Name" column in Table 4 to Table 6 are the same as those in Table 1 to Table 3, respectively. In Table 4 to Table 6, "a"/"b" in "#Ground states by naive method/#Original ground states matched" columns means that "a" is the number of ground states of the Ising model whose bit-width is reduced by the shift method and "b" is the number of the ground states that match the original ground states of the original Ising model, among the ground states obtained after the shift method is applied.

In Table 4 (random Ising model), the ground states of each Ising model whose bit-width is reduced to 3-bits by the shift method are found to be almost identical to the ground state of the original Ising model (see the underlined data in Table 4). On the other hand, the ground states of each Ising model whose bit-width is reduced to 2-bits by the shift method do not match very much the ground state of the original Ising model (see the double-underlined data in Table 4).

In Table 5 (NPP), the number of the ground states of each Ising model whose bit-width is reduced by the shift method is found to be hardly the same as that of the original Ising model. For example, when the bit-width of the Ising model for #14 (Ising model 90 shown in FIG. 9) is reduced by 3-bits or more, the optimal solution of NPP cannot be obtained. In the problems shown in #12 to #19 of Table 5, the number of the ground states of each Ising model whose bit-width is reduced to 2-bits by the shift method is found to be much more than the number of the ground states that match the original ground state of the original Ising model (see the underlined data in Table 5). In this case, the optimal solution of NPP can be hardly obtained.

In Table 6 (VCP), with respect to the graphs with the number of vertices being less than fifteen (se 1, cage 1, cage 2 in Table 6), the ground states of the Ising model whose bit-width is reduced by 1-bit by the shift method are equal to those of the original Ising model. However, when the size of the graph increases, the number of the ground states of the Ising model whose bit-width is reduced by 1-bit by the shift method does not match the number of the ground states of the original Ising model. Especially in "bfly 1" ($|V|=24$, $|E|=96$) of Table 6, after the bit-width of the original Ising model is reduced only by 1-bit, the optimal solution in VCP cannot be obtained at all.

According to the embodiments, by adding an auxiliary spin to an Ising model and setting a new interaction coefficient between the auxiliary spin and a spin of the Ising model to obtain a new Ising model, the size of coefficients (an interaction coefficient and an external magnetic field coefficient) of the Ising model is dispersed. Accordingly, it is possible to reduce the bit-width of the Ising model without changing the ground state. Thus, in the embodiments, even when the Ising model with the bit-width larger than hardware devices can handle is input, it is possible to accurately obtain the ground state of the Ising model.

The invention is not limited to the above-described embodiments, and various modifications can be made without departing from the scope of the invention. Other embodiments and variations made by those skilled in the art are intended to be embraced within the scope of the invention.

REFERENCE SIGNS LIST

100: Calculation Device
102: Processor
104: Memory
106: Storage Device
108: Input Unit
110: Display
112: Network Interface

The invention claimed is:

1. A calculation method for reducing a bit-width of an Ising model, the Ising model being expressed in terms of a plurality of spins, interaction coefficients between the plurality of spins, and external magnetic field coefficients acting respectively on the plurality of spins, the calculation method comprising:

adding an auxiliary spin to the Ising model; and setting a new interaction coefficient between the auxiliary spin and at least one of the plurality of spins to obtain a new Ising model, thereby reducing a bit-width of at least one of the interaction coefficients between the plurality of spins and the external magnetic field coefficients acting respectively on the plurality of spins.

2. The calculation method according to claim 1, wherein the auxiliary spin takes a value which minimizes an energy of the new Ising model.

3. The calculation method according to claim 1, wherein if an interaction coefficient between two spins of the plurality of spins is expressed in terms of sum of a first interaction coefficient and a second interaction coefficient, reducing the bit-width of the interaction coefficient between the two spins comprises:

partitioning the interaction coefficient between the two spins into the first interaction coefficient between the two spins and the second interaction coefficient between the two spins; and setting the first interaction coefficient between the auxiliary spin and a first spin of the two spins, and setting an absolute value of the first interaction coefficient between the auxiliary spin and a second spin of the two spins, thereby extending the first interaction coefficient between the two spins.

4. The calculation method according to claim 1, wherein if an external magnetic field coefficient acting on one spin of the plurality of spins is expressed in terms of sum of a first external magnetic field coefficient and a second external magnetic field coefficient, reducing the bit-width of the external magnetic field coefficient acting on the one spin comprises:

setting the first external magnetic field coefficient on the one spin;

setting the second external magnetic field coefficient on the auxiliary spin; and setting an absolute value of the second external magnetic field coefficient as the new interaction coefficient between the auxiliary spin and the one spin.

5. A calculation device configured to reduce a bit-width of an Ising model, the Ising model being expressed in terms of a plurality of spins, interaction coefficients between the plurality of spins, and external magnetic field coefficients acting respectively on the plurality of spins, the calculation device comprising a processor configured to:

add an auxiliary spin to the Ising model; and set a new interaction coefficient between the auxiliary spin and at least one of the plurality of spins to obtain a new Ising model, thereby reducing a bit-width of at least one of the interaction coefficients between the plurality of spins and the external magnetic field coefficients acting respectively on the plurality of spins.

6. A non-transitory computer-readable storage medium storing a program for executing a calculation method which reduces a bit-width of an Ising model, the Ising model being expressed in terms of a plurality of spins, interaction coefficients between the plurality of spins, and external magnetic field coefficients acting respectively on the plurality of spins, the program causing a computer to execute:

adding an auxiliary spin to the Ising model; and setting a new interaction coefficient between the auxiliary spin and at least one of the plurality of spins to obtain a new Ising model, thereby reducing a bit-width of at least one of the interaction coefficients between the plurality of spins and the external magnetic field coefficients acting respectively on the plurality of spins.

* * * * *